US012730031B2

(12) United States Patent
Decker et al.

(10) Patent No.: US 12,730,031 B2
(45) Date of Patent: Sep. 8, 2026

(54) LEAK DETECTORS

(71) Applicant: INFICON GmbH, Cologne (DE)

(72) Inventors: Silvio Decker, Cologne (DE); Simon Mathioudakis, Cologne (DE); Randolf Paul Rolff, Cologne (DE)

(73) Assignee: INFICON GmbH, Cologne (DE)

( * ) Notice: Subject to any disclaimer, the term of this patent is extended or adjusted under 35 U.S.C. 154(b) by 278 days.

(21) Appl. No.: 18/578,121

(22) PCT Filed: Jun. 1, 2022

(86) PCT No.: PCT/EP2022/064899
§ 371 (c)(1),
(2) Date: Jan. 10, 2024

(87) PCT Pub. No.: WO2023/006281
PCT Pub. Date: Feb. 2, 2023

(65) Prior Publication Data

US 2024/0310234 A1 Sep. 19, 2024

(30) Foreign Application Priority Data

Jul. 26, 2021 (DE) ........................ 102021119256.0

(51) Int. Cl.
*G01M 3/26* (2006.01)
*G01M 3/20* (2006.01)

(52) U.S. Cl.
CPC ................ *G01M 3/26* (2013.01); *G01M 3/20* (2013.01)

(58) Field of Classification Search
CPC ........ G01M 3/20; G01M 3/226; G01M 3/205; G01M 3/26
See application file for complete search history.

(56) References Cited

U.S. PATENT DOCUMENTS 3,968,675 A * 7/1976 Briggs .................. G01M 3/205 250/288
4,779,449 A * 10/1988 Bley ..................... G01M 3/229 73/40.7

(Continued)

FOREIGN PATENT DOCUMENTS

CN 111141458 A * 5/2020 ............. G01N 27/62
DE 69420205 T2 3/2000

(Continued)

OTHER PUBLICATIONS

Machine translation of CN111141458.*

*Primary Examiner* — Natalie Huls
(74) *Attorney, Agent, or Firm* — Kirton McConkie; Whitney Blair

(57) ABSTRACT

A leak detection device for combined integral and localizing leak detection, comprising a test specimen port (14), a test specimen high vacuum pump (16), the inlet of which is connected with the test specimen port (14), at least one pre-vacuum pump (20), the inlet of which is connected via a test specimen line (18) with the outlet (19) of the test specimen high vacuum pump (16), and a gas detector (32) connected with the pre-vacuum pump (20), which is connected via at least a first gas line (28) with the test specimen high vacuum pump (16), the test specimen line (18) and/or the specimen port (14) such that gas from the test specimen port (14) is supplied to the gas detector (32) via the gas line (28) for gas analysis, characterized in that a gas pressure measuring volume (22) connected with a gas pressure sensor is configured in the test specimen line (18) such that, during the gas measurement with the gas detector (32), an integral leak detection can be carried out by measuring the pressure profile in the gas pressure measuring volume (22).

32 Claims, 3 Drawing Sheets

(56) References Cited

Figure 1:
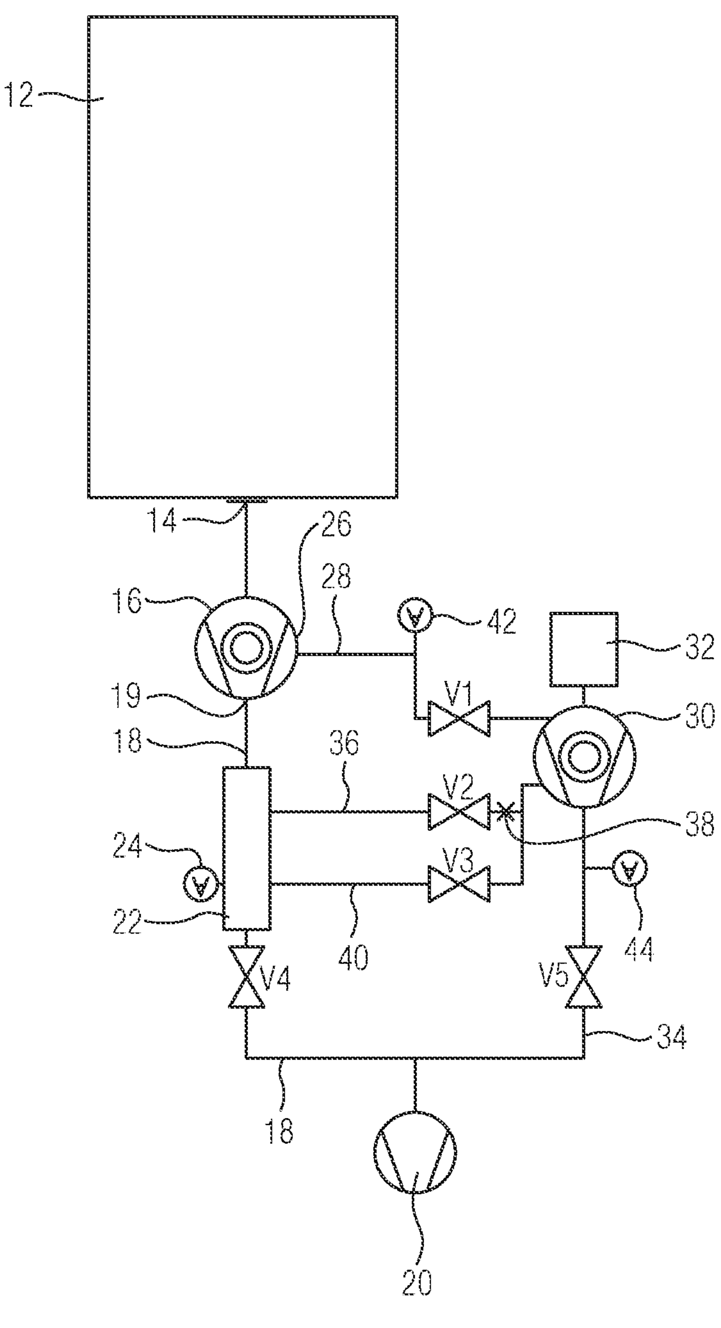

U.S. PATENT DOCUMENTS 5,625,141 A * 4/1997 Mahoney .............. G01M 3/329 73/40.7
5,708,194 A * 1/1998 Bohm ................ G01N 33/0011 73/40.7
5,880,357 A * 3/1999 Bohm ................... G01M 3/202 73/40.7
5,900,537 A * 5/1999 Bohm ................... G01M 3/202 73/40.7
6,014,892 A * 1/2000 Baret .................... G01M 3/202 73/40
6,415,650 B1 * 7/2002 Bohm ................... G01M 3/202 73/40
9,841,342 B2 * 12/2017 Walter .................. G01M 3/202
11,428,598 B2 * 8/2022 Coulomb .............. G01M 3/223
2005/0066708 A1 * 3/2005 Grosse-Bley ......... G01M 3/202 73/40.7
2006/0280615 A1 * 12/2006 Bohm ................... G01M 3/202 417/63
2011/0283769 A1 * 11/2011 Bohn .................... G01M 3/202 73/23.2
2013/0213114 A1 * 8/2013 Wetzig ................... G01N 25/20 73/25.03
2018/0328809 A1 * 11/2018 Bruhns ................. G01M 3/205
2019/0162193 A1 * 5/2019 Grosse Bley ........... F04D 25/16
2024/0019336 A1 * 1/2024 Wetzig .................... G01M 3/26
2024/0044737 A1 * 2/2024 Decker ................. F04D 19/046
2024/0264030 A1 * 8/2024 Liebich ................. G01M 3/205
2024/0310234 A1 * 9/2024 Decker ............... G01M 3/3272
2025/0020534 A1 * 1/2025 Strietzel ................ G01M 3/205

FOREIGN PATENT DOCUMENTS

DE 102009004363 A1 7/2010
EP 0432305 A1 6/1991
JP 07-146199 A 6/1995
JP 08-500675 A 1/1996
JP 2001-516014 A 9/2001
TW 200615527 A 5/2006

* cited by examiner

LEAK DETECTORS

This application is a National Stage of International Application No. PCT/EP2022/064899, filed Jun. 1, 2022, and entitled LEAK DETECTORS, which claims priority to German Patent Application No. DE 10 2021 119 256.0, filed Jul. 26, 2021, which are each incorporated herein by reference in their entirety.

The invention relates to a leak detection device and a leak detection method for combined integral and localizing leak detection.

In the “Rate of Rise” method for integral gas leak detection, a test specimen is evacuated with the aid of a vacuum pump, and then the total pressure profile in the evacuated test specimen is measured in order to infer a gas leak of the test specimen on the basis of the total pressure profile. If the pressure is substantially constant, it can be assumed that the test specimen is tight. If the total pressure profile increases, it is assumed that the test specimen has a leak.

As an alternative to integral leak detection, localizing leak detection is performed with the aid of a spray pistol or with the aid of a sniffer leak detector in order to localize the location of a leak in the test specimen. In conventional gas leak detection methods, either only integral leak detection or localizing leak detection could be performed. For pressure increase measurement, the volume to be tested must be completely isolated, i.e. the measuring volume must not be further evacuated during the measurement so as not to change the pressure. In contrast, however, a conventional leak detection apparatus with a test gas spray pistol requires continuous pumping of the gas to be measured from the test specimen. Simultaneous measurement of integral tightness and test gas spray leak detection is not possible with existing leak detection devices.

In contrast, the invention is based on the object of providing an improved leak detection device and an improved leak detection method.

In a first variant of the leak detection device according to the invention, a test specimen port to which the test specimen to be tested is connected, is connected with the inlet of a test specimen high vacuum pump. The outlet of the test specimen high vacuum pump is connected via a test specimen line with the inlet of a pre-vacuum pump. Furthermore, the pre-vacuum pump is connected with a gas detector which is connected via at least a first gas line with the test specimen high vacuum pump, the test specimen line, and/or the test specimen port such that the gas detector is supplied via the first gas line with gas from the test specimen port for gas analysis. The peculiarity of the first variant of the invention is that a gas pressure measuring volume connected with a gas pressure sensor is formed in the test specimen line such that during gas analysis with the gas detector an integral leak detection can be carried by simultaneous measurement of the pressure profile, e.g. the total pressure, the differential pressure, the gas pressure, or the partial pressure, in the gas pressure measuring volume.

In a second variant of the leak detection device according to the invention, a test specimen port is also provided to which the test specimen to be tested is connected, while the inlet of the pre-vacuum pump is connected via a detector line with the outlet of a detector high vacuum pump. The gas detector is connected with the inlet of the detector high vacuum pump and via at least one first gas line to the test specimen line and/or to the test specimen port such that the gas detector is supplied via the gas line with gas from the test specimen port. The peculiarity of the second variant of the invention is that a gas pressure measuring volume connected with the gas pressure sensor is formed in the detector line such that during the gas measurement with the gas detector an integral leak detection can be carried out by measuring the pressure profile in the gas pressure measuring volume.

The gas detector may be a partial pressure sensor capable of detecting a type of gas in a gas-selective manner, such as a mass spectrometer.

The common feature of both variants of the invention is that a gas pressure measuring volume connected with a gas pressure sensor enables integral leak detection by measuring the pressure profile in the gas pressure measuring volume while or after gas measurement is performed with the gas detector for localizing leak detection. While the gas detector is used for localizing leak detection, the gas pressure measuring volume and the gas pressure sensor connected thereto can be used for integral leak detection at the same time as or in rapid alternation with localizing leak detection.

In the leak detection method according to the invention for combined integral and localizing leak detection, a test specimen is first connected to the test specimen port, and the test specimen is then evacuated. Gas from the test specimen is transported into the gas pressure measuring volume, and the pressure profile of the total pressure is measured during a period in the gas pressure measuring volume. At the same time, the test specimen is sprayed with a test gas, e.g. in form of hydrogen or helium, and a partial flow of the gas drawn from the test specimen is supplied via the gas line to the gas detector and analyzed by the gas detector. Meanwhile, the test specimen high vacuum pump can divide the gas flow drawn from the test specimen such that light gas components are supplied via the gas line to the gas detector, while a large part of the gas extracted from the test specimen by the test specimen high vacuum pump is compressed into the gas pressure measuring volume. This is typically air. The air compressed into the gas pressure measuring volume cannot enter into the gas detector via the test specimen high vacuum pump.

Here, it is an advantage, if a selectively lockable stop valve is formed between the gas pressure measuring volume and the pre-vacuum pump in order to separate the gas pressure measuring volume during pressure increase measurement from the pre-vacuum pump. Thus, the pre-vacuum pump can be used during pressure increase measurement to evacuate the gas detector and/or a detector high vacuum pump connected with the gas detector. This can be particularly advantageous for a mass spectrometric gas detector.

The gas line can thereby connect an intermediate gas port of the test specimen high vacuum pump with the gas detector, e.g. via an intermediate gas port of the detector high vacuum pump. Alternatively or additionally, a gas line may be provided which connects the test specimen line between the test specimen high vacuum pump and pre-vacuum pump and/or the gas pressure measuring volume with the gas detector, e.g. via an intermediate gas port of the detector high vacuum pump. Here, a throttle with a preset conductance may be provided in the intermediate gas line in order to supply a continuous gas flow from the gas pressure measuring volume to the gas detector. Taking into account the known conductance of the throttle and/or the pressure drop across the throttle, the total pressure increase in the gas pressure measuring volume can be determined.

In particular, the test specimen high vacuum pump may be a booster pump which is operated together with a conventional mass spectrometric counterflow leak detector. Each intermediate gas line and, if possible, also the connection line between the detector high vacuum pump and the pre-vacuum pump should each be provided with a selectively closable stop valve.

The gas pressure measuring volume is provided with a gas pressure sensor for measuring the pressure profile in the gas pressure measuring volume. The gas pressure sensor may be a gas tightness sensor or a pressure gauge for total pressure measurement.

In the following, an exemplary embodiment of the invention will be explained in detail with reference to the figures.

Figure 2:
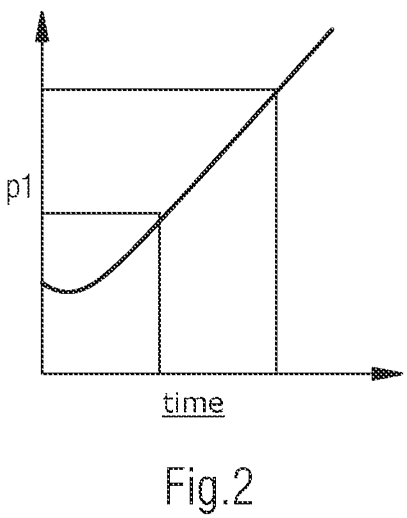
Figure 3:
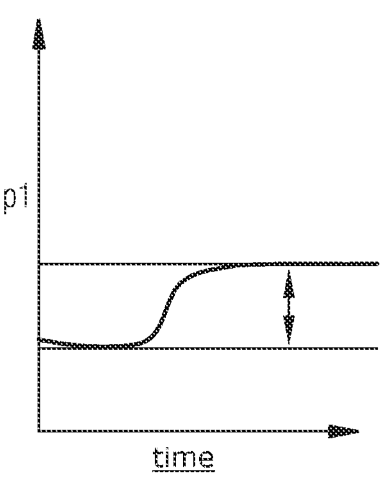
Figure 4:
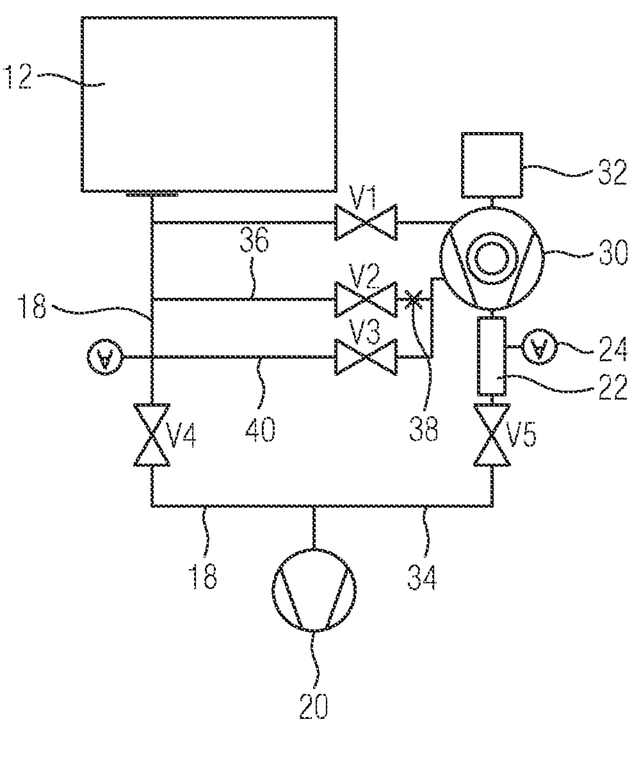
Figure 5:
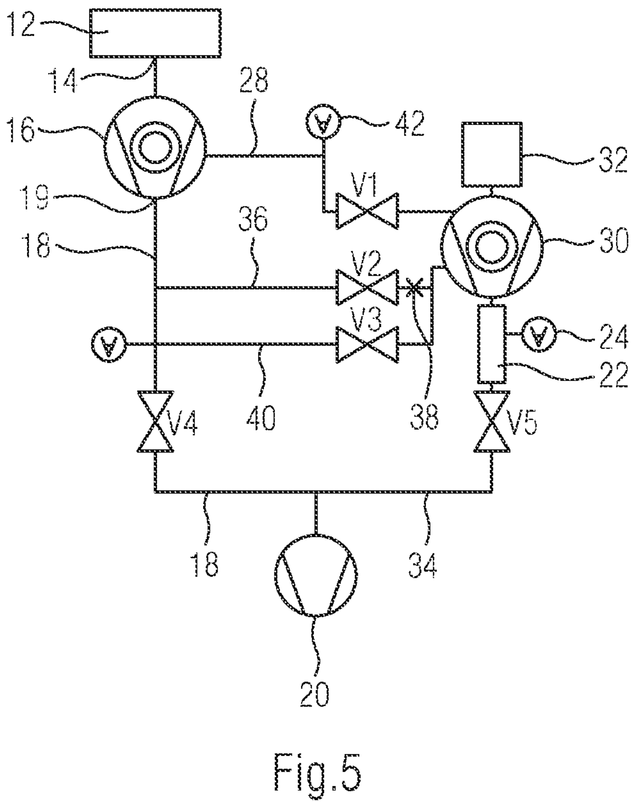

In the drawings:

FIG. 1 shows a schematic block diagram of a first exemplary embodiment of the leak detection device, FIG. 2 shows a first pressure profile, FIG. 3 shows a second pressure profile, FIG. 4 shows a schematic block diagram of a second exemplary embodiment of the leak detection device, and FIG. 5 shows a schematic block diagram of a third exemplary embodiment of the leak detection device.

The exemplary embodiment shown in FIG. 1 refers to the first variant of the invention. A test specimen 12 is connected to a test specimen port 14 which is connected with the input of a test specimen high vacuum pump 16 in a gas-conducting manner. The test specimen high vacuum pump 16 is connected via a test specimen line 18 with a pre-vacuum pump 20 and has a gas pressure measuring volume 22 which is connected via a first part of the test specimen line 18 with the outlet 19 of the test specimen high vacuum pump 16 and via a second part of the test specimen line 18 with the inlet of the pre-vacuum pump 20 in a gas-conducting manner. The gas pressure measuring volume 22 is connected with the gas pressure sensor 24 which measures the gas pressure p1 within the gas pressure measuring volume 22.

An intermediate vacuum port 26 of the test specimen high vacuum pump 16 is connected via a first gas line 28 with a detector high vacuum pump 30. The detector high vacuum pump 30 and the test specimen high vacuum pump 16 are each turbomolecular pumps of conventional design. The inlet of the detector high vacuum pump 30 is connected with the gas detector 32. The gas detector 32 is a mass spectrometer evacuated by the detector high vacuum pump 30. The detector high vacuum pump 30 is connected via a connection line 34 with the pre-vacuum pump 20. The assembly shown in FIG. 1 is a mass spectrometric gas leak detector based on the counterflow principle, in which the gas enters from the test specimen 12 via the gas line 28 in counterflow into the gas detector 32.

A second gas line 36 connects the gas pressure measuring volume 22 with a further intermediate gas port of the detector high vacuum pump 30. Here, the second gas line 36 has a throttle 38 with a preset and, for example, adjustable gas conductance. Via the second gas line 36, gas can continuously enter from the gas pressure measuring volume 22 in counterflow through the detector high vacuum pump 30 into the gas detector 32. While in the exemplary embodiment shown in FIG. 1 the first gas line 28 and the second gas line 36 are shown in combination, further exemplary embodiments, which are not shown in the Figures, are conceivable, in which either the first gas line 28 is provided without the second intermediate gas line 36, or in which the second intermediate gas line 36 is provided without the first gas line 28.

A third gas line 40 is conceivable in all exemplary embodiments and is provided in the exemplary embodiment shown in the Figure. The third gas line 40 connects the gas pressure measuring volume 22 in a gas-conducting manner with the further intermediate gas port of the gas detector high vacuum pump 30 and has a selectively closable valve V3. The gas pressure measuring volume 22 can be vented via the valve V3 and the third intermediate gas line 40.

The first gas line 28 has a selectively closable first stop valve V1. The second intermediate gas line 36 has a selectively closable second stop valve V2. The third intermediate gas line 40 has a selectively closable third stop valve V3. The second portion of the test specimen line 18 connecting the gas pressure measuring volume 22 and the pre-vacuum pump 20 has a selectively closable fourth stop valve V4. The connection line 34 connecting the detector high vacuum pump 30 with the pre-vacuum pump 20 has a selectively closable fifth stop valve V5.

The first gas line 28 is provided with a second pressure sensor 42 measuring the pressure at the intermediate gas outlet and the intermediate gas vacuum port 26 of the test specimen high vacuum pump 16, respectively.

The connection line 34 has third pressure sensor 44 between the fifth valve V5 and the outlet of the detector high vacuum pump 30 which measures the pressure at the outlet of the detector high vacuum pump 30.

The gas pressure sensor 24 is provided at the pre-vacuum port of the test specimen high vacuum pump 16 and thus to an extent at the inlet of the leak detector. In the method according to the invention, the pressure increase in the gas pressure measuring volume 22 is measured behind, i.e. downstream the test specimen high vacuum pump 16. The test specimen high vacuum pump 16 can also be referred to as a booster pump.

The test specimen high vacuum pump 16 separates the gas flow drawn from the test specimen 12 into light components, such as helium and/or hydrogen, which are mainly transported to the detector high vacuum pump 30 and serve for localizing leak detection (spray leak detection), while the major part of the air drawn from the test specimen 12 is transported into the gas pressure measuring volume 22 behind, i.e. downstream the test specimen high vacuum pump 16. Due to the large compression between the intermediate gas vacuum port 26 and the outlet of the test specimen high vacuum pump 16, the test specimen high vacuum pump 16 acts as a barrier for the air components. The gas pressure measuring volume 22 is cyclically closed by switching at least one of the valves in the detector lines 18, 36, 40 connected to the gas pressure measuring volume 22, i.e. at least one of the valves V2, V3 or V4, preferably by switching the third valve V3. As air flows in and is compressed by the test specimen high vacuum pump 16, the pressure in the gas pressure measuring volume 22 is increased and measured by the pressure sensor 24. The pressure increase is proportional to the integral leakage of the test specimen 12. In this regard, the intermediate gas vacuum port 26, which can also be referred to as the intermediate gas outlet, is continuously open and connected to the gas detector 32, more specifically a first intermediate gas port of the detector high vacuum pump 30. Thus, localizing leak detection, in this case in the form of spray leak detection, can be carried out simultaneously with integral leak detection based on the mass spectrometric counterflow principle.

As an alternative to completely closing the gas pressure measuring volume 22 via the fourth valve V4, the gas flow can be guided via the throttle 38 of a second intermediate gas line 36 to a second or the same intermediate gas port of the detector high vacuum pump 30. Gas that is compressed via the test specimen high vacuum pump 16 into the gas pressure measuring volume 22 can flow via the throttle 38 and in counterflow through the detector high vacuum pump 30 into the gas detector 32. The pressure drop via the throttle 38 can be determined and, like the pressure increase, is a measure for the integral leakage of the test specimen 12. In this method, it is also possible via the open intermediate gas vacuum port 26 of the test specimen high vacuum pump 16 to operate a localizing leak detection parallel to the integral leak detection.

In the following, the pressure increase measurement is described by means of the pressure profile curve in FIG. 2. In this process, gas entering the test specimen 12 through leakages is removed from the test specimen 12 by the test specimen high vacuum pump 16. Due to the compression differences, light gases, such as helium, are mainly transported to the detector high vacuum pump 30. Therefore, helium is often used as a test gas. Whereas the remaining air is mainly transported into the gas pressure measuring volume 22 behind the test specimen high vacuum pump 16. Since the compression between the intermediate gas vacuum port 26 of the test specimen high vacuum pump 16 and its outlet 19 for air components is large, the gas collects in the gas pressure measuring volume 22 and increases the pressure there. This pressure increase is proportional to the integral leak rate of the test specimen 12.

Since all inflowing gas in transported through the test specimen high vacuum pump 16, the pressure increase in the gas pressure measuring volume 22 is independent of the volume of the test specimen 12. The pressure is measured via a suitable total pressure sensor or gas tightness sensor (e.g., pressure sensor 24) connected to the gas pressure measuring volume 22.

The pressure in the gas pressure measuring volume 22 is preferably maintained within a range in which the test specimen high vacuum pump 16 can still maintain compression well and backflow of light gases is low. This is typically the case in a pressure range between 0 mbar and 5 mbar. In this respect, the pressure p1 should be maintained between 0 mbar and 5 mbar. If the pressure p1 increases too much, the gas can be removed by briefly opening at least one of the valves in the detector lines 18, 36, 40 connected to the gas pressure measuring volume 22, i.e. the second valve V2, the third valve V3 or the fourth valve V4 or any combination of these valves V2, V3, V4.

The pressure increase within the gas pressure measuring volume 22 is measured within a preset time t, or the time to reach a certain pressure increase is measured.

Simultaneously to the integral leakage measurement via the pressure increase method, a localizing leakage detection by means of light gases, such as helium or hydrogen, is also possible, since mainly light gases are transported to the gas detector 32 via the first valve V1. This makes it possible to simultaneously carry out a localizing leak detection by spraying the test specimen with a light test gas and an integral tightness measurement of the entire test specimen 12. The integral leak rate results from the volume VA of the gas pressure measuring volume 22 and the pressure increase $\Delta p/\Delta t$ for $q=VA\,[I]*\Delta p[mbar]/t[s]$.

If the first valve V1, the second valve V2, and the fifth valve V5 are open, while the third valve V3 and the fourth valve V4 are closed, a direct measurement of the integral tightness can be carried out by a pressure differential measurement. Here, in contrast to the above-described pressure increase measurement, the gas pressure measuring volume 22 is not completely closed. Via the throttle 38, gas is transported towards the detector high vacuum pump 30. This throttling leads to a pressure increase in the gas pressure measuring volume 22 which is measured by the first pressure sensor 24. This pressure increase is proportional to the amount of inflowing gas in the test specimen and thus to the leakage. The resulting pressure stroke is shown in FIG. 3 and is used here as a measure of the leakage. By briefly opening the third valve V3 and/or the fourth valve V4, the final pressure or equilibrium pressure of the unit can be determined. Then the flow results from the pressure difference between the equilibrium pressure when opening the third valve V3 and the pressure when the valve V3 is closed. As with the total pressure measurement method described above, integral leak detection and localizing helium or hydrogen leak detection are simultaneously possible.

The exemplary embodiments shown in FIGS. 4 and 5 refer to two variants of the invention in which the pressure measuring volume is provided in a portion of the detector line 34 connecting the pre-vacuum pump 20 with the detector high vacuum pump 30, namely between the valve V5 and the detector high vacuum pump 30. Here, the pressure in the pressure measuring volume 22 can be measured by the pressure sensor 24 via a cyclic closing and opening of the valve V5 in order to perform an integral leak detection based on the pressure increase method. When the valve V5 is closed, the pressure increase in the pressure measuring volume 22 is measured. This pressure increase is proportional to the integral leak rate of the test specimen 12. With valve V1 open at the same time, test gas sprayed on test specimen 12 for localizing leak detection can be detected by the gas detector to localize leaks in test specimen 12.

Alternatively or additionally, the gas detector 32 can be used to determine a steady increase in a test gas signal, for example in the form of the helium content contained in air, if air from the atmosphere surrounding the test specimen 12 enters the test specimen 12 through a leak and is supplied from there to the gas detector 32. In this way, an integral leak detection can also be carried out. Without modification of the device, a localizing detection can then be performed immediately by spraying the test specimen 12 with a test gas, such as helium.

From the combination of these two possibilities, an internal leak in the test specimen 12, for example in the form of a burst nitrogen line inside the test specimen 12, can be distinguished from an external leak that exists in the outer shell of the test specimen 12. An internal leak results in a pressure rise that is measurable by the pressure sensor 24 without an increase in the test gas (for example, helium) background signal in the gas detector 32.

The invention claimed is:

1. A leak detection device for combined integral and localizing leak detection, comprising a test specimen port, a specimen high vacuum pump, the inlet of which is connected with the test specimen port, at least one pre-vacuum pump, the inlet of which is connected via a test specimen line with the outlet of the specimen high vacuum pump, and a gas detector connected with the at least one pre-vacuum pump, which is connected via at least a first gas line with the specimen high vacuum pump, the test specimen line and/or the test specimen port such that gas from the specimen port is supplied to the gas detector via the first gas line for gas analysis, wherein a gas pressure measuring volume connected with a gas pressure sensor is configured in the test specimen line such that, during gas measurement with the gas detector, an integral leak detection can be carried out by measuring the pressure profile in the gas pressure measuring volume, and a device is provided for deactivating the effect of the suction capacity of the at least one pre-vacuum pump on the gas pressure measuring volume while measuring the pressure profile in the gas pressure measuring volume with the gas pressure sensor.

2. The leak detection device according to claim 1, wherein the device for deactivating the effect of the suction capacity of the at least one pre-vacuum pump on the gas pressure measuring volume is provided in the form of a stop valve or a shut-off device for the at least one pre-vacuum pump.

3. The leak detection device according to claim 1, wherein the first gas line is connected with an intermediate gas port of the test specimen high vacuum pump.

4. The leak detection device according to claim 1, wherein at least one of the test specimen line and other gas lines connected with the gas pressure measuring volume is provided with a throttle.

5. The leak detection device according to claim 1, wherein the gas line and/or at least one intermediate gas line opens into a detector high vacuum pump evacuating the gas detector.

6. The leak detection device according to claim 5, wherein the outlet of the detector high vacuum pump is connected with the pre-vacuum pump in order to be evacuated thereby.

7. The leak detection device according to claim 1, wherein the gas detector is a mass spectrometer.

8. The leak detection device according to claim 1, wherein the gas pressure sensor is a pressure gauge as a total pressure sensor, a gas tightness sensor, or a differential pressure sensor.

9. The leak detection device according to claim 1, wherein at least one other gas line provided with a selectively closable stop valve is provided and/or that the first gas line has a selectively closable stop valve.

10. The leak detection device according to claim 1, wherein a selectively clos-able stop valve is provided in a detector line connecting a detector high vacuum pump and the at least one pre-vacuum pump.

11. The leak detection device according to claim 10, wherein the stop valve is formed in a portion of the detector line connecting the gas pressure measuring volume with the at least one pre-vacuum pump.

12. The leak detection device according to claim 1, wherein the test specimen line has a selectively closable stop valve between the gas pressure measuring volume and the at least one pre-vacuum pump.

13. A leak detection method for combined integral and localizing leak detection with a leak detection device according to claim 1, characterized by the following steps:

connecting a test specimen to the test specimen port, evacuating the test specimen, extracting gas from the test specimen into the gas pressure measuring volume and measuring a pressure profile in the gas pressure measuring volume, spraying the test specimen with test gas, and transporting a partial gas flow of the gas drawn from the test specimen to the gas detector, and analyzing the gas with the gas detector while measuring the pressure profile in the gas pressure measuring volume with the gas pressure sensor.

14. A leak detection device for combined integral and localizing leak detection, comprising a test specimen port, a detector high vacuum pump, at least one pre-vacuum pump, an inlet of which is connected via a detector line with the outlet of the detector high vacuum pump, and a gas detector connected with the inlet of the detector high vacuum pump, which is connected via at least a first gas line with:

a test specimen line which connects the inlet of the at least one pre-vacuum pump with an outlet of a specimen high vacuum pump, an inlet of which is connected with the test specimen port, and/or the test specimen port such that gas from the specimen port is supplied to the gas detector via the first gas line for gas analysis, wherein a gas pressure measuring volume connected with a gas pressure sensor is configured in the detector line such that, during gas measurement with the gas detector, an integral leak detection can be carried out by measuring the pressure profile in the gas pressure measuring volume, and a device is provided for deactivating the effect of the suction capacity of the at least one pre-vacuum pump on the gas pressure measuring volume while measuring the pressure profile in the gas pressure measuring volume with the gas pressure sensor.

15. The leak detection device according to claim 14, wherein a specimen high vacuum pump is provided, the inlet of which is connected with the test specimen port and the outlet of which is connected via a specimen line with the at least one pre-vacuum pump.

16. The leak detection device according to claim 14, wherein the device for deactivating the effect of the suction capacity of the at least one pre-vacuum pump on the gas pressure measuring volume is provided in the form of a stop valve or a shut-off device for the at least one pre-vacuum pump.

17. The leak detection device according to claim 14, wherein the first gas line is connected with an intermediate gas port of the test specimen high vacuum pump.

18. The leak detection device according to claim 14, wherein at least one of the test specimen line and other gas lines connected with the gas pressure measuring volume is provided with a throttle.

19. The leak detection device according to claim 14, wherein at least one throttle is provided in an intermediate gas line connecting the gas pressure measuring volume with the detector high vacuum pump.

20. The leak detection device according to claim 14, wherein the gas line and/or at least one intermediate gas line opens into the detector high vacuum pump evacuating the gas detector.

21. The leak detection device according to claim 14, wherein the outlet of the detector high vacuum pump is connected with the pre-vacuum pump in order to be evacuated thereby.

22. The leak detection device according to claim 14, wherein the gas detector is a mass spectrometer.

23. The leak detection device according to claim 14, wherein the gas pressure sensor is a pressure gauge as a total pressure sensor, a gas tightness sensor, or a differential pressure sensor.

24. The leak detection device according to claim 14, wherein at least one other gas line provided with a selectively closable stop valve is provided and/or that the first gas line has a selectively closable stop valve.

25. The leak detection device according to claim 14, wherein a selectively closable stop valve is provided in the detector line connecting the detector high vacuum pump and the at least one pre-vacuum pump.

26. The leak detection device according to claim 14, wherein a stop valve is formed in a portion of the detector line connecting the gas pressure measuring volume with the at least one pre-vacuum pump.

27. The leak detection device according to claim 14, wherein the test specimen line has a selectively closable stop valve between the gas pressure measuring volume and the at least one pre-vacuum pump.

28. A leak detection method for combined integral and localizing leak detection with a leak detection device according to claim 14, characterized by the following steps:

connecting a test specimen to the test specimen port, evacuating the test specimen, extracting gas from the test specimen into the gas pressure measuring volume and measuring a pressure profile in the gas pressure measuring volume, spraying the test specimen with test gas, and transporting a partial gas flow of the gas drawn from the test specimen to the gas detector, and analyzing the gas with the gas detector while measuring the pressure profile in the gas pressure measuring volume with the gas pressure sensor.

29. The leak detection method according to claim 28, wherein the partial gas flow is transported at least via the first gas line or via the first gas line and an intermediate gas line having a known throttle.

30. The leak detection method according to claim 29, wherein the throttle is taken into account when transporting the partial gas flow via the intermediate gas line for determining the pressure profile in the gas pressure measuring volume.

31. The leak detection method according to claim 28, wherein, while measuring the pressure profile in the gas pressure measuring volume with the gas pressure sensor, the effect of the suction capacity of the at least one pre-vacuum pump on the gas pressure measuring volume is deactivated.

32. The leak detection method according to claim 28, wherein at least one gas line path connecting the gas pressure measuring volume with the at least one pre-vacuum pump the test specimen line or at least one intermediate gas line, is cyclically closed and reopened as a function of the pressure measured in the pressure measuring volume, a leak in the test specimen is inferred in the closed state on the basis of a measured pressure increase in the pressure measuring volume based on the pressure increase method.

* * * * *